United States Patent
Vedam et al.

(10) Patent No.: US 11,409,264 B2
(45) Date of Patent: Aug. 9, 2022

(54) PROCESS OPTIMIZATION SERVER AND SYSTEM

(71) Applicant: AVEVA Software, LLC, Lake Forest, CA (US)

(72) Inventors: Rajkumar Vedam, Katy, TX (US); Sreenivas Rao Bukka, Houston, TX (US); Detong Zhang, Katy, TX (US); Purt Tanartkit, Yorba Linda, CA (US)

(73) Assignee: AVEVA Software, LLC, Lake Forest, CA (US)

( * ) Notice: Subject to any disclaimer, the term of this patent is extended or adjusted under 35 U.S.C. 154(b) by 266 days.

(21) Appl. No.: 16/509,599

(22) Filed: Jul. 12, 2019

(65) Prior Publication Data

US 2020/0019145 A1 Jan. 16, 2020

Related U.S. Application Data

(60) Provisional application No. 62/697,079, filed on Jul. 12, 2018.

(51) Int. Cl.
*G05B 19/4155* (2006.01)

(52) U.S. Cl.
CPC ............ *G05B 19/4155* (2013.01); *G05B 2219/32291* (2013.01)

(58) Field of Classification Search
CPC ...... G05B 19/4155; G05B 2219/32291; G05B 13/048
See application file for complete search history.

(56) References Cited

U.S. PATENT DOCUMENTS

| | | | |
|---|---|---|---|
| 7,171,897 B2 * | 2/2007 | Barajas | H05K 3/1233 101/129 |
| 10,915,075 B2 * | 2/2021 | Jiang | G05B 13/048 |
| 2010/0198368 A1 * | 8/2010 | Mestha | G03G 15/065 700/28 |
| 2015/0277399 A1 | 10/2015 | Maturana et al. | |
| 2016/0065656 A1 | 3/2016 | Patin et al. | |
| 2016/0320768 A1 | 11/2016 | Zhao et al. | |

(Continued)

OTHER PUBLICATIONS

International Search Report and Written Opinion for International Application No. PCT/US2019/041632, dated Oct. 30, 2019, 10 pages.

*Primary Examiner* — Thomas C Lee
*Assistant Examiner* — Ameir Myers
(74) *Attorney, Agent, or Firm* — Greenberg Traurig, LLP

(57) ABSTRACT

Some embodiments include a server system including a first logic module executable by a processor for receiving a data communication from an industrial control system coupled to a communications network. In some embodiments, the data communication comprises data or data streams associated with the industrial process. The program logic of the first logic module includes a model configured to receive a variable and iterate and converge an optimization problem to an optimization solution to a first level of optimization based at least in part on the variable and the data or data streams. A second logic module executable by the processor is operatively data-linked to the first logic module and utilizes a model to iteratively process data values of the optimization solution to a second level of optimization with an increased level of optimization over the first level of optimization.

17 Claims, 5 Drawing Sheets

(56) References Cited

U.S. PATENT DOCUMENTS

| | | |
|---|---|---|
| 2017/0205809 A1 | 7/2017 | Sayyarrodsari et al. |
| 2017/0205813 A1 | 7/2017 | Sayyarrodsari et al. |
| 2019/0243320 A1* | 8/2019 | Quirynen .............. G05B 13/048 |
| 2020/0006946 A1* | 1/2020 | Fife .................... G06Q 10/0639 |
| 2020/0348633 A1* | 11/2020 | Thorpe .............. G05B 19/4185 |

* cited by examiner

PROCESS OPTIMIZATION SERVER AND SYSTEM

CROSS-REFERENCE TO RELATED APPLICATIONS

This application claims the benefit of and priority to U.S. Provisional Patent Application No. 62/697,079, filed Jul. 12, 2018, entitled, "PROCESS OPTIMIZATION SERVER AND SYSTEM", the entire contents of which are incorporated herein by reference.

BACKGROUND

Within online process optimization applications, rigorous runtime process optimization is often run at intervals when an industrial plant or facility is in steady-state, and optimal set-points are generated for a distributed control system ("DCS"). For example, an online rigorous on-line modeling and equation-based optimization program can run periodically when the plant is at a steady-state, performing a rigorous optimization that considers (i) phase-changes, (ii) variable bounds, and (iii) plant nonlinearities and discontinuities, and (iv) performs rigorous thermodynamic calculations, in order to receive new controller set-points for the next period. These new set-points are used by advanced process control (hereinafter referred to as "APC") systems as tracking targets to optimally or more desirably operate the industrial plant or facility.

Customers often run a rigorous on-line modeling and equation-based optimization program several times in a day to obtain the target set points. One challenge that they sometimes face is the need to wait for a relatively steady or steady-state operation of the plant or facility prior to running the rigorous on-line modeling and equation-based optimization program. If the intervals between steady-states are long, there can be missed opportunities for optimization, especially if there are pricing changes and/or feed changes. In response to such a requirement, vendors are proposing simplified solutions that can ostensibly be used between consecutive rigorous optimizer runs, using the APC or DCS. In periods between consecutive runs, APC can perform a linear programming optimization on manipulated variables ("MV") and control variables ("CV"), and obtain simpler incremental targets to track. Such a use-case allows incremental set-point changes with a view to operating at least sub-optimally.

In the period between two rigorous optimization runs, there is a need to get incremental set-point changes, especially when key variables are known to (or likely to) have changed. Current practices for incremental optimization include:

(a) use of identified first order or gain models as linear programming constraints and use of user-set cost-coefficients for a linear programming run for new incremental set-points, or (b) use of data and measurement reconciled models (such as, for example, nonlinear reactors), and the sensitivity of their outputs to feed as cost-direction inputs to a linear programming that uses simplified constraint models, and/or (c) use of grey-box models that encode expert knowledge in measurements-based correlation models to generate the incremental set-points.

The conventional method (a) uses gain or first-order identified models as constraints between controlled variables and manipulated variables. If the models lose operational significance, a new process-adaptation is undertaken to update the coefficients. This model is more appropriate for a feedback controller, rather than for use as an optimizer, due to the conservative validity of the region of linearization and model applicability. Also, the use of pre-set cost coefficients does not provide an accurate picture of where the optimal direction is. Thus, the use of a method that (a) can neither guarantee incremental optimality, nor maintain the new solution on a direction that is not distant from the rigorous optimization direction. If the incremental optimizer drifts far from the actual optimal set-points, then the work-load on the tracking control-system will be high in the next cycle of rigorous optimization.

The conventional method (b) provides conservative linear models due to keeping out of bounded regions for meaningful sensitivity-based results. This restricts the validity of the model around a bounded region (where optimal solutions are typically found). The use of such a model for incremental optimization generally cannot does not provide optimal results, even when using linear cost vectors from an on-line modeling and equation-based optimization system and process.

In the conventional method (c), the use of grey-box models and data-estimated correlations are also subjected to linear region conservatism. The design of experiments for parameter estimation carefully avoids the bounded regions in order to gain meaningful input-output causal correlations. Further, the use of such models for incremental optimization, where the plant is already at bounds again tends to provide suboptimal results.

Incremental linear optimization is today performed by customers between two rigorous optimization runs by using simplified linear models and estimated cost-coefficients, as listed in (a), (b) and (c) above. However, such linear programming solutions might not point to the process-optimal direction.

APC performs the dual task of regulation at a set-point as well as tracking a set-point change. In the process industry, simple gain and first order models are used to represent an input-output behavior of a selected control loop, capturing the behavior between the MV and CV, the parameters of which are tuned to measured signals. Such models are commonly used for feedback control. When used for linear optimization, the MV-CV linear models can be used as linear constraints for linear programming. When the parameters of such models are estimated using measurements, the estimation is typically done when the plant does not have variables saturated at bounds, so that the linear correlations capture the causal input-output relationship correctly. This also implies that such models describe conservative regions of linearization (see schema 10 of FIG. 1).

Further, rigorous optimization often results in variables being pushed against bounds. In such a regime, use of conservative linear models as discussed above will produce lower quality linear programming solutions. Additionally, when used with APC, the objective function weights are either fixed a priori or updated using some reconciled-model sensitivity. Some vendors supply the sensitivity of the outputs with respect to feeds using rigorous models that are data-reconciled but not optimized. Such sensitivities are then used as the weights for the linear programming optimizer's objective function.

There are at least two issues with the above methodology of obtaining linear cost function weights. In the first case, the use of fixed weights cannot represent dynamic energy pricing, nor can it represent the true sensitivity of the objective with respect to feeds or products, and can only be a heuristic. In the second case, computing the sensitivity when the rigorous model is at some bounds (as can be expected in data-reconciled rigorous models that take note of current variable bounds) can give incorrect correlations. Such correlations can misguide the linear programming optimizer and provide poor results.

In either case, the linear programming optimizer works with "data-constructed" conservative linear models and sensitivity based (or fixed) cost function. FIG. 1. schematically shows model validity for nonlinear and linear models, and FIG. 2. schematically shows the impact of running linear programming using conservative linear models versus running linear programming using a dimensionally correct, "maximal" linear model. The use of conservative linear models for linear programming can result in undesirable performance such as large variations in setpoints and subsequent transients that can result in product wastage and increased workload on the tracking control systems (see FIG. 2, the upper plot 15). Referring to the lower plot 17 of FIG. 2, incremental set change strategies rely on linear programming (linear processes), and the advantages of using linear programming are the availability of robust algorithms for solution, fast time to obtain a solution (when compared with rigorous optimization) and the ability to reliably converge to a solution, if one exists. A linear programming run requires (a) objective function weights; (b) linear constraints representing the plant; and (c) incremental variable-bounds.

It is well-known that the actual plant behavior is nonlinear, and applying the results of a linear programming optimization run on the nonlinear plant results in suboptimal behavior. Depending on the quality of the linear models and objective weights, a variety of suboptimal behaviors can be expected. Poor optimization results can have the following effects: (i) instead of providing profitable operation, it may guide the plan away from profitability, (ii) the set-point tracking controller's work-load in moving out of the region of the rigorous optimization set-points will increase, potentially to poor regions, and (iii) repeated poor optimization directions between two rigorous optimization runs can have the cumulative effect of straying far from an optimal region, resulting in large set-point changes during rigorous runs (to bring back optimality) with the attendant large tracking controller transients with potential product wastage, and (iv) rigorous optimizers typically operate a plant at some magnitude constraints. If the linear models used for incremental set-point changes with linear programming do not reflect this aspect of the plant behavior, they can potentially result in poor behavior.

Hence, there exists a need to provide improved programming methods with industrial simulation, reconciliation and process optimization applications such as Aveva ROMeo® optimization software to obtain incremental set-point changes, including in periods where key variables have changed.

SUMMARY

Some embodiments include a server system comprising at least one processor configured to be coupled to a communications network, and a non-transitory computer-readable storage medium for tangibly storing thereon program logic for execution by the processor. In some embodiments, the program logic comprises a first logic module executable by the at least one processor for receiving at least one data communication from at least one industrial control system coupled to the communications network. In some embodiments, the at least one data communication comprises data or data streams associated with at least a portion of the at least one industrial process. In some further embodiments, the program logic of the first logic module comprises at least one model configured to receive at least one variable and iterate and converge an optimization problem to at least one optimization solution to a first level of optimization based at least in part on the at least one variable and at least a portion of the data or data streams. Further, some embodiments include a second logic module executable by the at least one processor that is operatively data-linked to the first logic module, and configured to utilize a model to iteratively process data values of the at least one optimization solution to a second level of optimization, where the second level of optimization has an increased level of optimization over the first level of optimization.

In some embodiments, the first logic module comprises a rigorous on-line modeling and equation-based optimization ("ROMEO") module. In some further embodiments, the model used to iteratively process data values of the at least one optimization solution to a second level of optimization comprises a linear model derived from the at least one model of the first logic module.

In some embodiments, the linear model is derived from the first logic module following convergence to the at least one optimization solution. In some embodiments, F can be defined as the system of nonlinear equations describing the process. In some embodiments, the linear model is $J_z \Delta z + J_w \Delta w = 0$, where $J_z$ is the Jacobian of F with respect to the independent variables, z, and $J_w$ is the Jacobian of F with respect to the dependent variables, w, and $\Delta$ is an operator that shows the corresponding quantity is a perturbation from its nominal value.

In some embodiments of the invention, coefficients are obtained by a linearization shown mathematically as $$J_z = \frac{\partial F(z, w)}{\partial z}\bigg|_{z=z_0, w=w_0}, J_w = \frac{\partial F(z, w)}{\partial w}\bigg|_{z=z_0, w=w_0},$$

where $J_z$ is the Jacobian of F with respect to the independent variables, z, and $J_w$ is the Jacobian of F with respect to the dependent variables, w.

In some embodiments, the optimization problem is represented as max $\emptyset(z,w)$, s.t. $F(z,w)=0$, and $z \in [z_{MIN}, z_{MAX}]$, and $w \in [w_{MIN}, w_{MAX}]$ for variables $X=[z, w]$, where z are the independent variables, and w are the dependent variables. In some embodiments, an optimal solution of the optimization problem comprises a linearization at a solution point represented as $$\max C^T \begin{bmatrix} \Delta z \\ \Delta w \end{bmatrix}, \text{s.t. } [J_z \ J_w] \begin{bmatrix} \Delta z \\ \Delta w \end{bmatrix} = b(z, w)_0,$$

and $\Delta(z, w)_{min} \leq \Delta(z, w) \leq \Delta(z, w)_{max}$, where C is the vector of cost coefficients corresponding to a linearization of $\phi$ in the optimization problem, and $J_z$ is the Jacobian of F with respect to the independent variables, z, and $J_w$ is the Jacobian of F with respect to the dependent variables, w, b is a constant vector, and $\Delta$ is an operator that shows the corresponding quantity is a perturbation from its nominal value.

In some embodiments, the model used to iteratively process data values of at least one optimization solution to a second level of optimization comprises a dimensionally invariant linear model. In some embodiments, the model of the second logic module is configured to utilize an actual distance to lower and upper bounds from the at least one optimization solution. In some embodiments, the model of the second logic module is configured to enable customizable objective weights. In some further embodiments, the second logic module is configured to change lower and upper bounds and variables of the model.

In some embodiments, the second logic module is configured to generate incremental set-point changes between runs of the first logic module. In some further embodiments, the second logic module includes an ability to perform a quasi-dynamic optimization over a transient period.

Some further embodiments include enabling a user to select and manipulate sliders on a variables interface on a display, where the sliders represent dependent and independent variables for use in an iterative process of at least one of the first logic module and the second logic module.

Some embodiments include a server system comprising at least one processor configured to be coupled to a communications network, and a non-transitory computer-readable storage medium for tangibly storing thereon a rigorous on-line modeling and equation-based optimization ("ROMEO") logic module executable at by the at least one processor and configured to receive at least one variable and to perform an iterative process of an optimization problem to at least one optimization solution using a model comprising $J_z \Delta z + J_w \Delta w = 0$. In this instance, $J_z$ is the Jacobian of F with respect to the independent variables, z, and $J_w$ is the Jacobian of F with respect to the dependent variables, w, and $\Delta$ is an operator that shows the corresponding quantity is a perturbation from its nominal value. Some embodiments include a variable interface enabling a user to provide the at least one variable by selecting and manipulating sliders on a variables interface on a display, where the sliders represent dependent and independent variables for use in an iterative process.

In some embodiments, the optimization problem is represented as max $Ø(z,w)$, s.t. F $(z,w)=0$, and $z \in [z_{MIN}, z_{MAX}]$, and $w \in [w_{MIN}, w_{MAX}]$ for variables $X=[z, w]$, where z are the independent variables, and w are the dependent variables. In some embodiments, the logic module includes an ability to perform a quasi-dynamic optimization over a transient period. In some embodiments, the logic module comprises a first logic module configured iterate and converge the optimization problem to at least one optimization solution to a first level of optimization. In some further embodiments, a second logic module is operatively data-linked to the first logic module, and is configured to utilize a model to iteratively process data values of the at least one optimization solution to a second level of optimization, the second level of optimization having an increased level of optimization over the first level of optimization. Further in some embodiments, the model is derived from the first logic module.

DETAILED DESCRIPTION

Figure 1:
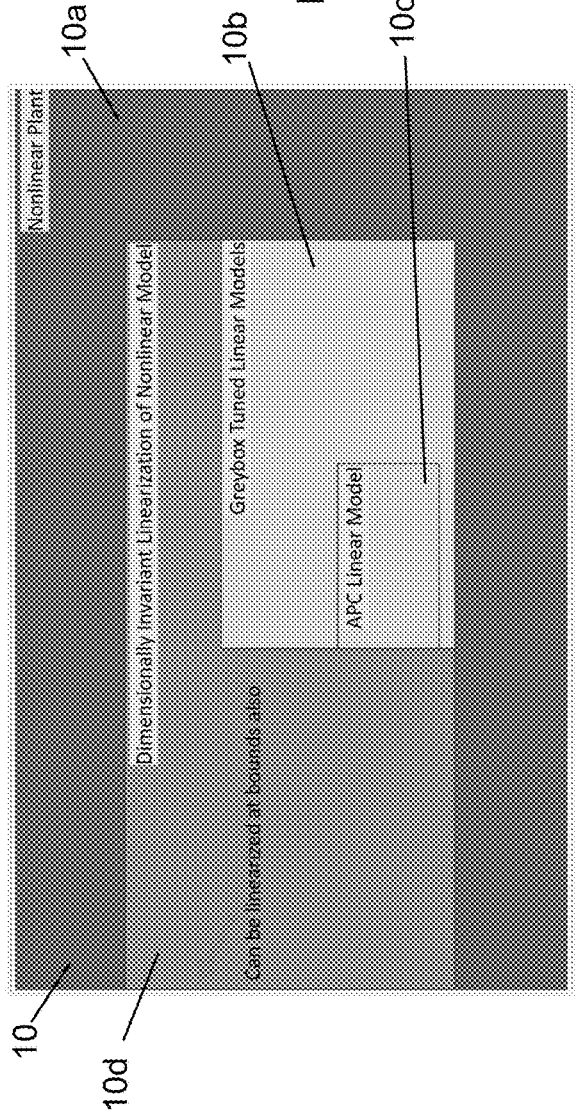
FIG. 1. schematically shows model validity for nonlinear and linear models.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Embodiments of the invention herein generally describe non-conventional approaches for rigorous on-line modeling and equation-based optimization systems and methods that are not well-known, and further, are not taught or suggested by any known conventional methods or systems. Moreover, the specific functional features are a significant technological improvement over conventional methods and systems, including at least the operation and functioning of a computing system that are technological improvements. These technological improvements include one or more aspects of the systems and method described herein that describe the specifics of how a machine operates, which the Federal Circuit makes clear is the essence of statutory subject matter.

One or more of the embodiments described herein include functional limitations that cooperate in an ordered combination to transform the operation of a data repository in a way that improves the problem of data storage and updating of databases that previously existed. In particular, some embodiments described herein include system and methods for managing single or multiple content data items across disparate sources or applications that create a problem for users of such systems and services, and where maintaining reliable control over distributed information is difficult or impossible.

The description herein further describes some embodiments that provide novel features that improve the performance of communication and software, systems and servers by providing automated functionality that effectively and more efficiently manages resources and asset data for a user in a way that cannot effectively be done manually. Therefore, the person of ordinary skill can easily recognize that these functions provide the automated functionality, as described herein, in a manner that is not well-known, and certainly not conventional. As such, the embodiments of the invention described herein are not directed to an abstract idea and further provide significantly more tangible innovation. Moreover, the functionalities described herein were not imaginable in previously-existing computing systems, and did not exist until some embodiments of the invention solved the technical problem described earlier.

Some embodiments of the invention include rigorous on-line modeling and equation-based optimization systems and methods that utilize linear programming with linear models that are derived from a ROMeo® optimization software, where variable bounds can be set by ROMeo® optimization software as well as the cost coefficients for incremental optimization. Embodiments of the invention circumvent difficulties found in conventional methods. Embodiments of the invention described herein can use incremental bounds as provided or notified by ROMeo® optimization software, where available incremental bounds are communicated to the linear optimizer. Further, in some embodiments, the use of ROMeo® optimization software's cost coefficients for a linear programming can ensure that the incremental linear programming optimizer is completely aligned with ROMeo® optimization software in terms of the model, and the optimization direction and will not impose additional burdens on the tracking control system.

Some embodiments include novel elements as follows:

1. Use of the most updated, optimistic linear model, derived from rigorous optimization models.

2. Use of the latest cost coefficients obtained from rigorous optimization for the linear programming optimizer helps ensure real-world optimality.

3. Use of incremental bounds as notified by rigorous optimizer ensures realistic linear programming optimization in the most feasible direction.

4. Incremental process optimization functionality can be available in an "ROMeo Analytics" product or module that can be tightly coupled with ROMeo® optimization software, and detailed further below.

Some embodiments include a linear model from a rigorous optimization model that was data-reconciled in a prior optimization instant. In some embodiments, the linear model is dimensionally the same as nonlinear rigorous models and corresponds to the same variables and equations. Some embodiments utilize the latest linearized cost coefficients from the rigorous optimization model for the linear programming optimizer. This ensures that the linear programming optimizer will essentially provide incremental optimization solutions that will not be far from the rigorous optimizer. Again, this is in contrast to the methods (a)-(c) that use simplified or pre-set cost-coefficients for the linear programming optimization.

In some embodiments of the invention, if the previous rigorous optimizer landed at a bounded solution, the resulting linear model can understand the incremental bounds and can provide the best solution compared with (a)-(c). Note that the linear models in (a)-(c) should necessarily be constructed (using design of experiments) such that bounds are not reached in order to enable causal correlations, failing which, the models will encode incorrect correlations. Such models do not reflect the latest operation of the models that might be at constraints.

In one non-limiting example embodiment, the Aveva ROMeo® optimization software solver is based on a reduced gradient, infeasible path, active-set, sequential quadratic programming algorithm. The ROMeo® optimization software solver can solve industrial-scale nonlinear optimization problems for real-time optimization, and for off-line work. ROMeo® provides an integrated, graphical workflow management environment that enables users to automate the optimization and reporting. Users can define complex event sequences for closed-loop optimization without manual intervention. Task sequences can be configured to detect operational events or conditions (e.g., steady state), or to run on a scheduled frequency. ROMeo® process optimization reporting can enable plant staff to satisfy all physical and quality operating constraints, perform "what-if" analyses to improve product yields and quality, determine the cost of constraints and the benefits of debottlenecking, identify faulty instrumentation and resolve processing problems quickly, utilize personnel, inventory, and capital resources more efficiently, and acquire current information for more accurate short-term and long-term planning. ROMeo® optimization software solvers can be used in at least three alternative modes of operation to solve a process problem: (1) a "simulation" mode in which it solves a problem defined by a set of nonlinear equations; (2) a "data reconciliation" mode in which it solves a least squares optimization problem; and (3) an "optimization" mode in which it solves a nonlinear optimization problem.

In a simulation mode, as a first step, the existing process can be modeled in abstract using a wide variety of pre-defined ROMeo® optimization software unit operations. These models range from simple mixers, splitters and flash drums to complete distillation columns and reactors. In addition, ROMeo® optimization software allows for the inclusion of virtually any type of custom unit operation in the process plant model. In contrast to ordinary process simulation programs that carry out calculations in a unit-by-unit, sequential manner, ROMeo® optimization software converts the abstract physical model into a single mathematical model that is solved using non-linear matrix arithmetic. This solution method offers considerable time saving, and permits ROMeo® optimization software to serve as a real-time simulation tool.

In a data reconciliation mode, in a second step, the abstract model is brought into harmony with actual observed operating conditions. This is achieved by reconciling redundant and sometimes inconsistent temperature, pressure, composition and flow rate measurements using established algorithms for evaluating the validity of observed process data. Based on reconciled observed data, process model unit specifications and parameters are modified and adjusted to make the process model conform even more closely to observed reality. ROMeo® optimization software typically interfaces directly with a plant's DCS or centralized database and run in an online mode. In this case, no user input is required. However, because it is possible to supply measurement values manually via the graphical user interface, data reconciliation can also be executed in an offline mode.

In an optimization mode, the pertinent process variables are assigned monetary values, and controller set points are adjusted to maximize the economics of the overall process. Typical examples of monetary assignments would be greater values for preferred stream fractions compared to less desirable fractions, bonuses for additional octane points in a product or a monetary penalty for each ppm of a contaminant or undesirable compound in a stream.

In reference to FIG. 1, the modes of operation involve a basic iterative update, shown in the following equation (1):

$$x_{k+1} = x_k + \lambda_k p_k \tag{1}$$

In Equation (1), vector x is the set of variables in the problem, with iteration index, k. The new values of the variables x at iteration k+1 are the addition of the old values of the variables x at iteration k, and an update-vector p at iteration k, multiplied by a scalar line-search parameter called λ. ROMeo® optimization software solvers have a rich set of parameters to customize the behavior to the many classes of problems to which it is applied. Each ROMeo® optimization software solver has a default set of parameters to help it solve problems "out-of-the-box". One source of poor convergence is poor initial estimates of variables of a specific problem evaluated by a ROMeo® optimization software solver. The various embodiments herein deal with uncertain initial estimates in ROMeo® optimization software solvers, particularly estimates based on poor initial estimates of the variables of a specific problem.

Figure 3:
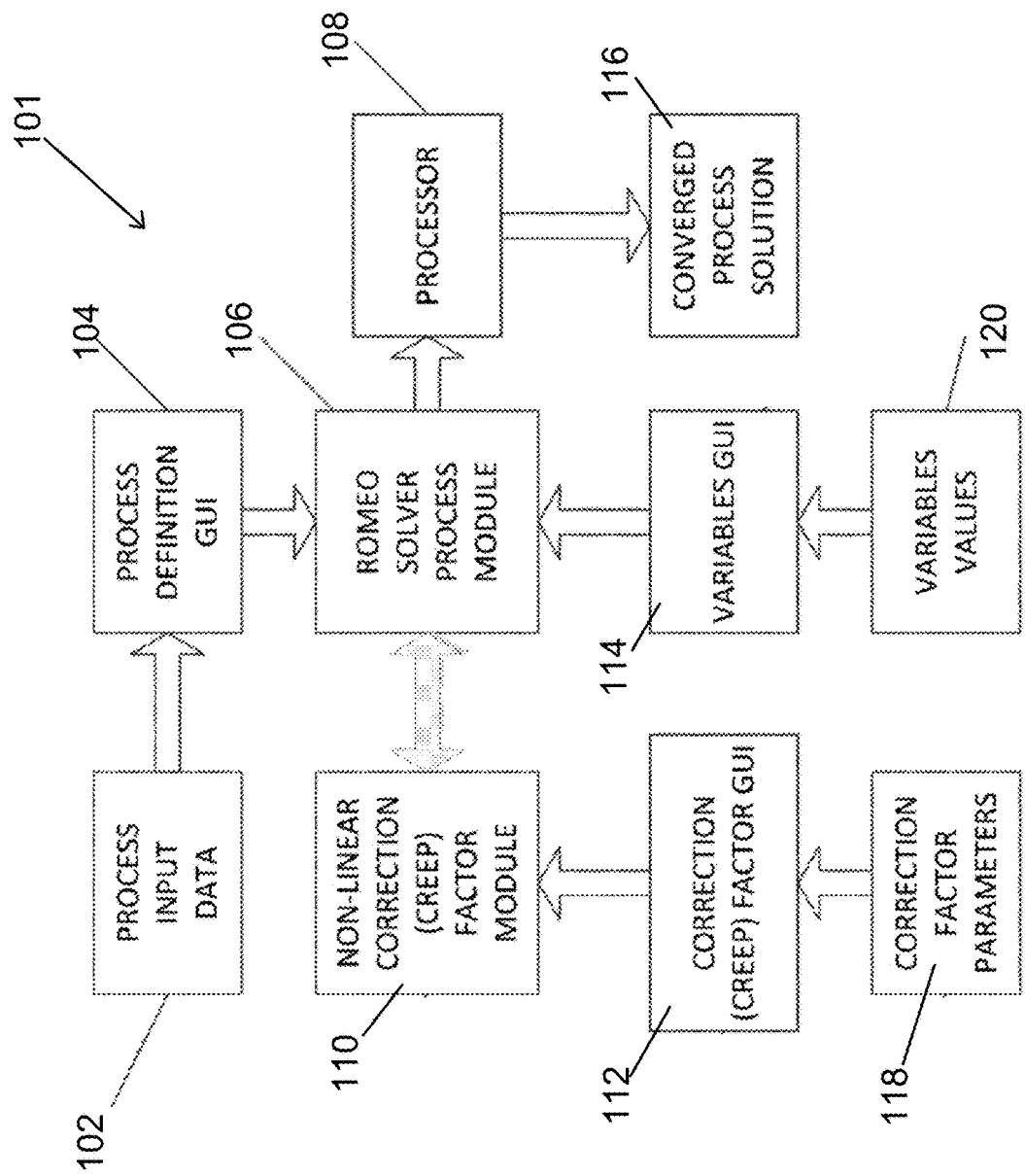
FIG. 3 is a block diagram of one example of a ROMeo® solver system in accordance with some embodiments of the invention.

FIG. 3 is a block diagram 101 of one example embodiment of a server-enabled ROMeo® optimization method. Some embodiments include a process module 102 of software instructions comprising a storage memory device having stored thereon processor executable instructions for defining an iterative process having variables. The variables have certain values which, when applied to the iterative process, converge the iterative process to a solution. The variables have other values which, when applied to the iterative process, do not converge the iterative process to a solution. Some embodiments include a process module 106 comprising an on-line modeling and equation-based optimization (herein "ROMeo®") optimization solver module. In some embodiments, a process definition interface 104 such as a graphical user interface (hereinafter "GUI") can receive process input data from the process module 106 from a source such as a user, from another software program, or from a device, where the data defines a particular iterative process corresponding to the process problem to be solved (shown as process input data 102). In some embodiments, the process definition interface 104 can provide the received process input data to the process module 106 for use in executing an iterative model to solve the selected process problem as noted herein.

In some embodiments of the invention, a variables interface 114 (such as a GUI) receives variables input data (e.g., variable values 120) from a source such as a user, from another software program or from a device, which data define values for the variables of the iterative process. In some embodiments, the variables interface 114 can provide the received variables input data to the process module 106 for use in executing an interactive model to solve the process problem as noted herein.

As noted above, the processor executable instructions for defining an iterative process stored on the process module 106 can implement three alternative modes of operation to iteratively solve the process problem (using processor 108): (1) a "simulation" mode in which the problem is defined by a set of nonlinear equations; (2) a "data reconciliation" mode in which the problem is defined as a least squares optimization problem; and (3) an "optimization" mode in which the problem is defined as a nonlinear optimization problem. Uncertainty in initial estimates can be present in any mode of operation, but commonly, in data reconciliation runs. Uncertain initial estimates can cause convergence problems, especially if the estimates are far from the solution, and/or are inconsistent leading to poor directions. Further details of the ROMeo® solver can be found in U.S. Pat. No. 9,703,901 B2, the entire contents of which are incorporated by reference. In some embodiments, the processor 108 can produce a converged process solution 116. Some embodiments further include a non-linear correction (creep) factor module 110 that can use correction factor parameters 118 from a correction (creep) factor GUI 112.

Figure 4:
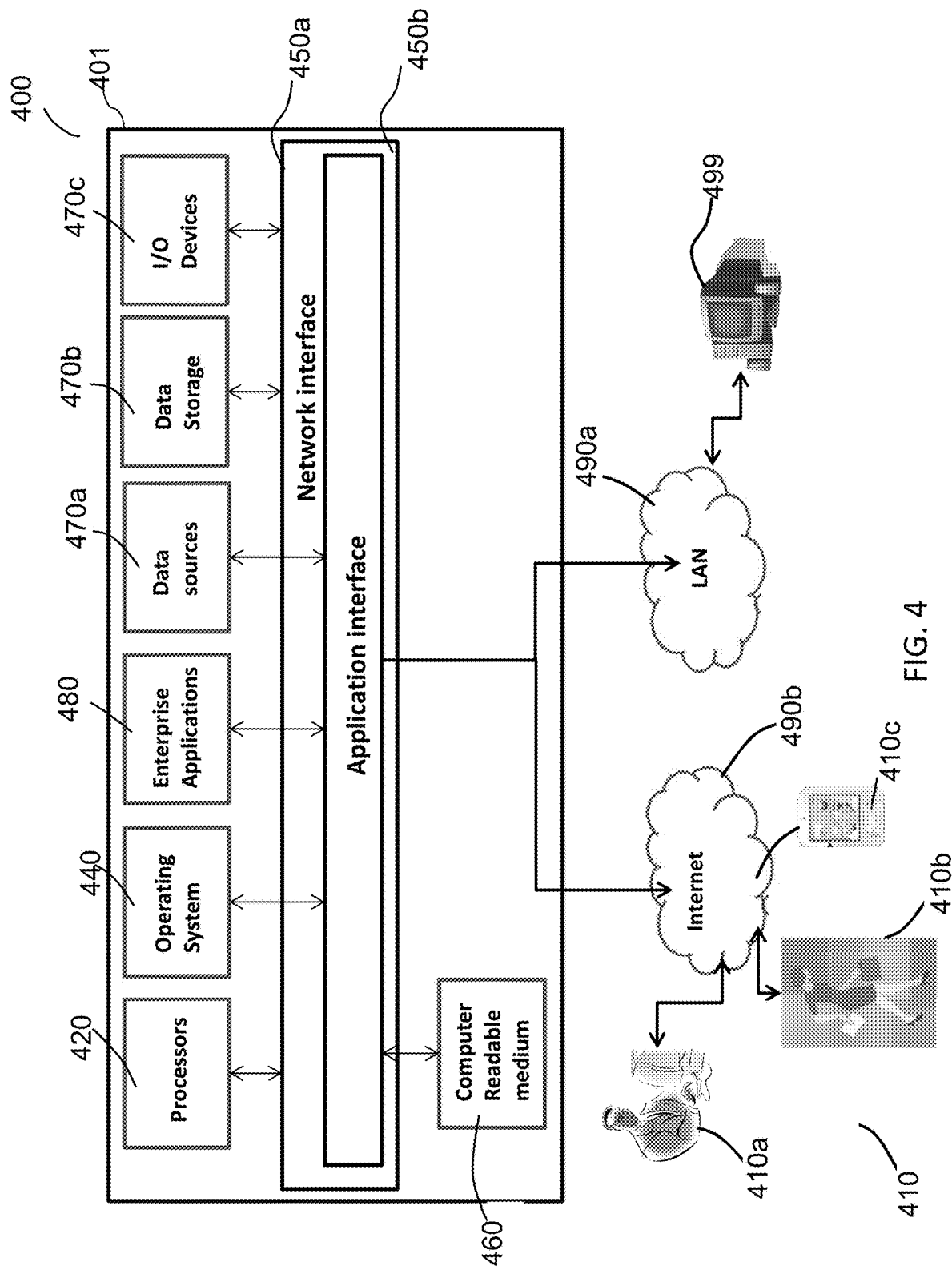
FIG. 4 illustrates an example computing system of the process optimizer system in accordance with some embodiments of the invention.

In reference to FIG. 4, in some embodiments, the processor 108 can comprise computer 401 of the computer system 400 that is configured for process optimization systems and methods in accordance with some embodiments of the invention. In some embodiments, the computer system 401 can process one or more software modules of the aforementioned process optimization system and method applications, and can be configured to display information related to process optimization within one or more graphical user interfaces. For example, any of the non-limiting embodiments including displays, portals, or web pages described earlier can be processed and controlled by the computer system 401. In some embodiments, the computer system 401 can comprise at least one computing device including at least one processor 420. In some embodiments, the at least one processor 420 can include a processor residing in or coupled to one or more server platforms. In some embodiments, the computer system 401 can include a network interface 450a and an application interface 450b coupled to the least one processor 420 capable of processing at least one operating system 440. Further, in some embodiments, the interfaces 450a, 450b coupled to at least one processor 420 can be configured to process one or more of the software modules 480 (e.g., such as enterprise applications). In some embodiments, the software modules 480 can include server-based software that can include process optimization system and method software modules. In some embodiments, the software modules 480 can operate to host at least one user account and/or at least one client account, and operating to transfer data between one or more of these accounts using the at least one processor 420.

With the above embodiments in mind, it should be understood that the invention can employ various computer-implemented operations involving process optimization system and method data stored in computer systems. Moreover, in some embodiments, the above-described databases and models throughout the process optimization system and method can store analytical models and other data on computer-readable storage media within the computer system 401 and on computer-readable storage media coupled to the computer system 401. In addition, the above-described applications of the process optimization system and method system can be stored on computer-readable storage media within the computer system 401 and on computer-readable storage media coupled to the computer system 401. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments of the invention, the computer system 401 can comprise at least one computer readable medium 460 coupled to at least one data source 470a, and/or at least one data storage device 470b, and/or at least one input/output device 470c. In some embodiments, the invention can be embodied as computer readable code on a computer readable medium 460. In some embodiments, the computer readable medium 460 can be any data storage device that can store data, which can thereafter be read by a computer system (such as the computer system 401). In some embodiments, the computer readable medium 460 can be any physical or material medium that can be used to tangibly store the desired information or data or instructions and which can be accessed by a computer or processor 420. In some embodiments, the computer readable medium 460 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 460 can transmit or carry instructions to a computer 499 and/or at least one user 410, including a router, private or public network, or other transmission device or channel, both wired and wireless. In some embodiments, the software modules 480 can be configured to send and receive data from a database (e.g., from a computer readable medium 460 including data sources 470a and data storage 470b that can comprise a database), and data can be received by the software modules 480 from at least one other source. In some embodiments, at least one of the software modules 480 can be configured within the system to output data to at least one user 410 via at least one graphical user interface rendered on at least one digital display.

In some embodiments of the invention, the computer readable medium 460 can be distributed over a conventional computer network via the network interface 450a where the process optimization system and method system embodied by the computer readable code can be stored and executed in a distributed fashion. For example, in some embodiments, one or more components of the computer system 401 can be coupled to send and/or receive data through a local area network ("LAN") 490a and/or an internet coupled network 490b (e.g., such as a wireless internet). In some further embodiments, the networks 490a, 490b can include wide area networks ("WAN"), direct connections (e.g., through a universal serial bus port), or other forms of computer-readable media 460, or any combination thereof.

In some embodiments, components of the networks 490a, 490b can include any number of user devices such as personal computers including for example desktop computers, and/or laptop computers, or any fixed, generally non-mobile internet appliances coupled through the LAN 490a. For example, some embodiments include personal computers 499 coupled through the LAN 490a that can be configured for any type of user including an administrator. Other embodiments can include personal computers 499 coupled through network 490b. In some further embodiments, one or more components of the computer system 401 can be coupled to send or receive data through an internet network (e.g., such as network 490b). For example, some embodiments include at least one user 410 coupled wirelessly and accessing one or more software modules of the process optimization system and method system including at least one application 480 via an input and output ("I/O") device 470c. In some other embodiments, the computer system 401 can enable at least one user 410 to be coupled to access at least one application 480 via an I/O device 470c through LAN 490a. In some embodiments, the user 410 can comprise a user 410a coupled to the computer system 401 using a desktop computer, and/or laptop computers, or any fixed, generally non-mobile internet appliances coupled through the internet 490b. In some further embodiments, the user 410 can comprise a mobile user 410b coupled to the computer system 401. In some embodiments, the user 410b can use any mobile computing device 410c to wireless coupled to the computer system 401, including, but not limited to, personal digital assistants, and/or cellular phones, mobile phones, or smart phones, and/or pagers, and/or digital tablets, and/or fixed or mobile internet appliances, or virtual reality display devices (e.g., such as VR helmets, goggles or glasses).

In some embodiments, the computer system 401 can enable one or more users 410 coupled to receive, analyze, input, modify, create and send data to and from the computer system 401, including to and from one or more enterprise applications running on the computer system 401. In some embodiments, at least one software application 480 running on one or more processors 420 can be configured to be coupled for communication over networks 490a, 490b through the internet 490b. In some embodiments, one or more wired or wirelessly coupled components of the network 490a, 490b can include one or more resources for data storage. For example, this can include any other form of computer readable media in addition to the computer readable media 460 for storing information, and can include any form of computer readable media for communicating information from one electronic device to another electronic device.

In some embodiments of the invention, the "ROMeo Analytics" module or process for use with software such as ROMeo® optimization software can be a linear or non-linear programming (using a linear model or non-linear model) configured to perform one or more of the processes, including, but not limited to, analyze a solution, perform a what-if analysis with perturbation, perform a what-if analysis with linear programming, perturb variables and/or their bounds, and examine the impact of changes on the variables and the objective variable. In some embodiments, a linear model of the ROMeo Analytics model or process is derived from ROMeo® optimization software when it has converged to the optimization result. In some embodiments, the linear model is the Jacobian, and contains the same number of free independent and dependent variables and equations that the nonlinear ROMeo® optimization software model used. In some embodiments, the linear model is dimensionally invariant from the nonlinear ROMeo® optimization software model.

In some embodiments, it should be noted further that the bounds used by the linear model can be made aware of the distance to the actual upper-bound and actual lower-bound from the point of linearization, and thus can have an accurate measure of the bounds for linear programming. If the ROMeo® optimization software solution pushed against some variable bounds, there can still be a linearization that is valid in one direction for that bounded variable, and with zero room to move in the bounded direction.

Finally, in some embodiments, the ROMeo Analytics module or process can use a linearized version of the objective function used by the ROMeo® optimization software. This ensures that the direction that the solution will move will be similar for both ROMeo® optimization software and the linear programming, provided the perturbations are not large enough to move out of the region of linear-model validity. If for any reason the user wishes to customize the objective weights, the ROMeo Analytics tool can be used to provide a customized solution to process optimization information.

FIG. 1 schematically shows that the nonlinear model 10a of the ROMeo® optimization software has the largest region of validity for the models (the actual plant has an even larger region of validity). The dimensionally invariant linear model 10b has the next largest region of validity. Normally, by Taylor expansion of a nonlinear function around a point, the linear component is the largest compared with higher-order-terms. Thus, it is justifiable to schematically show the linear region slightly smaller than the nonlinear region. In contrast, greybox models 10c that use known model structures with estimated parameters might have smaller conservative regions, as also the conservative linear models of APC 10d.

Figure 2:
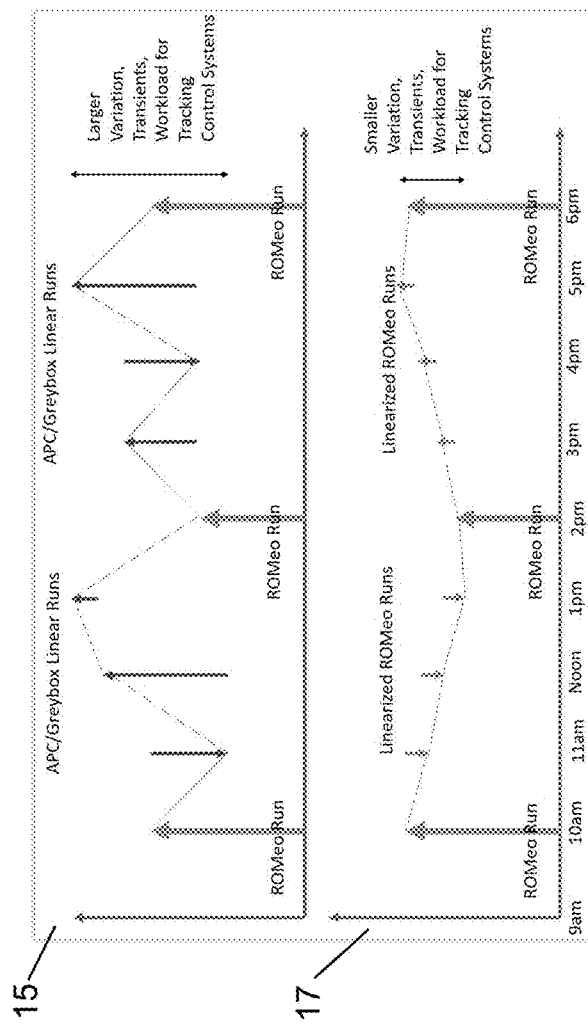
FIG. 2. schematically shows the impact of running linear programming using conservative linear models versus running linear programming using a dimensionally correct, "maximal" linear model.

The linear programming model that uses the dimensionally invariant linear model has the correct degrees of freedom, and solutions will invariably reach the most limiting boundaries. By Taylor's expansion, such a solution is expected to proceed in a direction similar to a ROMeo® optimization software run. Thus, when linear programming is used between ROMeo® optimization software runs, it can be expected that the incremental setpoint changes proceed in a direction that ROMeo® optimization software might have taken. This results in smaller variations and transients, and therefore, less product wastage and lighter workload on the tracking control systems, implying lower energy costs, due to smaller operation of control equipment. See FIG. 2 (lower plot 117).

The lower energy costs in this method can make the scheme more optimal than one that uses conservative linear models. The linear programming run is faster than a ROMeo® optimization software run, and can be deployed several times between ROMeo® optimization software runs, and can accomplish a quasi-dynamic optimization over transient periods. Accordingly, some embodiments of the invention improve server functionality by reducing computationally intensive demands of prior art processes. The algorithm will also work exactly with a linear quadratic programming (QP) objective function as all linear programming solvers can accommodate a QP objective function.

In summary, the ROMeo Analytics module server, system and process can permit generating incremental set-point changes. In some embodiments, the module or process can use a dimensionally invariant "maximal" linear model after ROMeo® optimization software has converged, use of which for linear programming gives the best possible result. Some embodiments include a module or process that can use a linearized objective function from ROMeo® optimization software. In some embodiments, the module or process can use an actual distance to lower and upper bounds from the linearized solution as bounds for linear programming. In some embodiments, the module or process can include an ability to customize objective weights for the linear programming. In some embodiments, the module or process can include an ability to change the bounds and variables for the linear programming. In some embodiments, the module or process can include an ability to generate incremental set-point changes several times between rigorous ROMeo® optimization software runs. In some embodiments, the module or process can include an ability to do quasi-dynamic optimization over a transient period.

In some embodiments, the module or process can include an ability to provide a lower workload on tracking control systems because the variation is expected to be less at the boundaries of rigorous ROMeo® optimization software runs. In some embodiments, the module or process can include an ability to enable lower energy costs than APC/greybox based models (FIG. 1).

In some embodiments, the ROMeo® optimization software can solve a nonlinear optimization problem that can be represented as shown below:

Considering a partition of the variables X=[z, w], where z are the free independent variables, and w are the free dependent variables, an optimization problem can be as follows:

$$\max \varnothing(z,w), s.t. F(z,w)=0, \text{ and } z \in [z_{MIN}, z_{MAX}], \text{ and } w \in [w_{MIN}, w_{MAX}] \tag{i}$$

Typically, the economic function being maximized is expressed as a profit, i.e., value products-produced minus energy-costs and feed costs. This is solved in ROMeo® using reduced-gradient, sequential quadratic programming, using an active-set method for the constraints. At the optimal solution of (i), there can be a linearization of (1) at the solution point, represented as follows:

$$\max C^T \begin{bmatrix} \Delta z \\ \Delta w \end{bmatrix}, \text{ s.t. } [J_z \ J_w] \begin{bmatrix} \Delta z \\ \Delta w \end{bmatrix} = b(z,w)_0, \tag{ii}$$

$$\text{and } \Delta(z,w)_{min} \le \Delta(z,w) \le \Delta(z,w)_{max}$$

Here, we identify the following components:

C is the vector of cost coefficients corresponding to a linearization of ϕ in (i).

F can be defined as the system of nonlinear equations describing the process.

$J_z$ is the Jacobian of F with respect to the independent variables, z.

$J_w$ is the Jacobian of F with respect to the dependent variables, w.

b is a constant vector that might result due to a perturbation of the function F at the point (z,w). At a solution, b=0.

Δ is an operator that shows the corresponding quantity is a perturbation from its nominal value.

The linear model obtained from ROMeo® at the converged solution can be written as:

$$J_z \Delta z + J_w \Delta w = 0 \tag{iii}$$

This linear model is dimensionally the same as the nonlinear model (i) used by ROMeo®. Its coefficients are obtained from ROMeo® as a consequence of linearizing the original nonlinear equations at the solution point. The coefficients of (iii) are obtained by a linearization, shown mathematically as follows:

$$J_z = \frac{\partial F(z,w)}{\partial z}\bigg|_{z=z_0, w=w_0}, J_w = \frac{\partial F(z,w)}{\partial w}\bigg|_{z=z_0, w=w_0} \tag{iv}$$

ROMeo® includes a mathematical engine that can interpret the nonlinear algebra equations and automatically generate the linearized coefficients evaluated at the point specified. Thus, in some embodiments, when ROMeo® has converged to an answer, it is possible to obtain the matrices shown in (iv) automatically, and this is used by ROMeo Analytics.

The coefficients of the cost function are obtained by the linearization shown mathematically below:

$$C = \left[ \begin{array}{cc} \dfrac{\partial \phi}{\partial z} & \dfrac{\partial \phi}{\partial w} \end{array} \right]\bigg|_{z=z_0, w=w_0} \quad \text{(v)}$$

As noted earlier, ROMeo®'s mathematical engine automatically generates these coefficients. Because these are the linearization of the actual nonlinear cost-function, the use of (v) in linear programming optimization can lead to a better optimal than the methods used by APC or grey-box models.

The bounds noted in (i) are translated to the incremental bounds specified in (ii). As an example, assume that $z_{max}=5$ and $z_{min}=0$ for the nonlinear model (i). Let (i) converge to, z=3. Then there is room for the incremental bounds to go from $\Delta z_{max}=5-3=2$ and $\Delta z_{min}=0-3=-3$.

Figure 5:
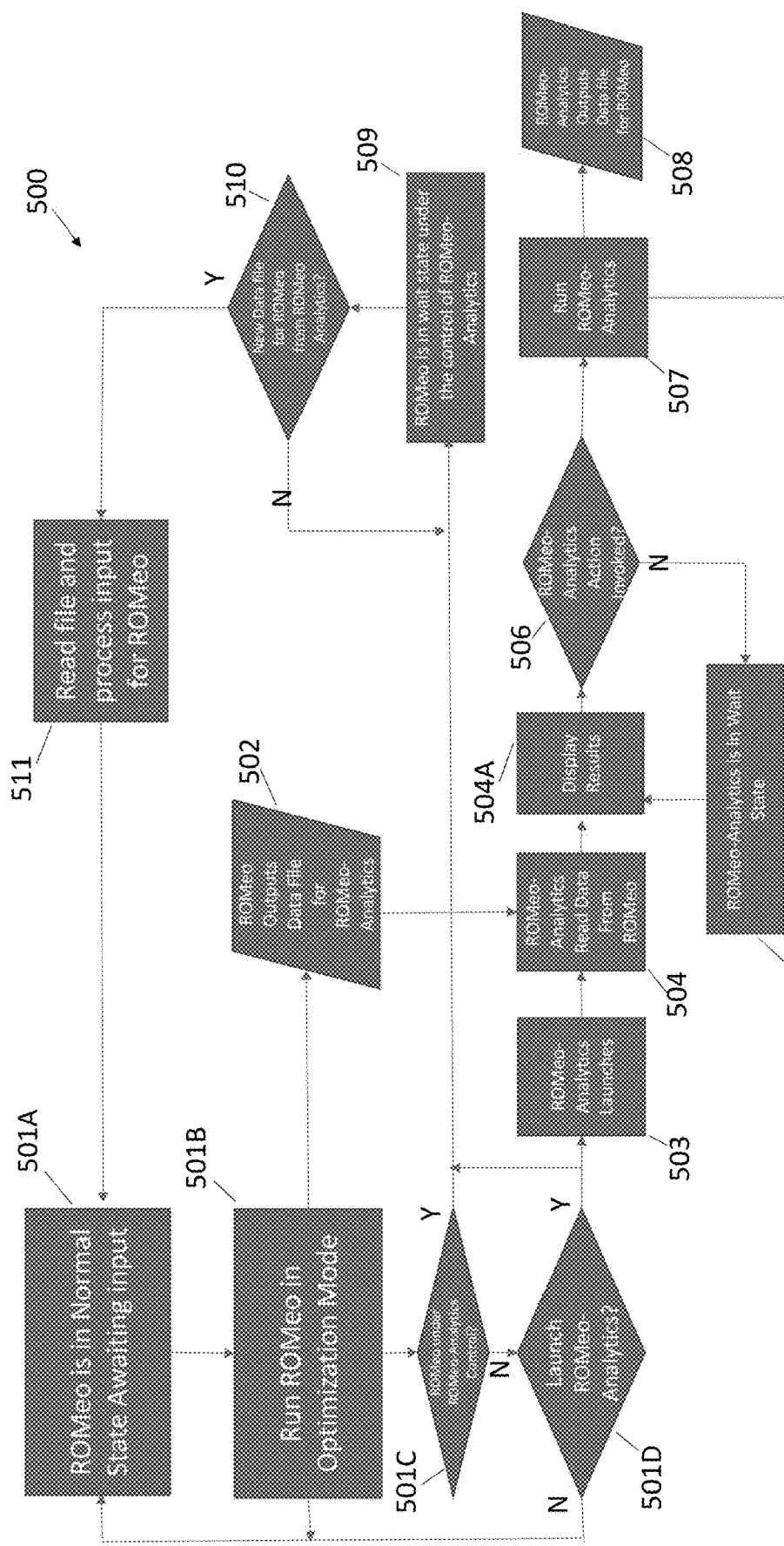
FIG. 5 shows the overall schematic for one mode of operation of "ROMeo Analytics", where it interacts with ROMeo® according to some embodiments of the invention.

In reference to FIG. 5, showing the overall schematic 500 for one mode of operation of ROMeo Analytics, where it interacts with ROMeo®, in 501A-501D, according to some embodiments of the invention, ROMeo® waits for user/ROMeo Analytics input 501A and runs optimization 501B, and outputs a data file for ROMeo Analytics 502. In some embodiments, a user can launch ROMeo Analytics from ROMeo® 501D, in which case ROMeo Analytics launches 503 and reads 504 the data file from 502, displays the results 504A and puts ROMeo® in a controlled-wait state 509, otherwise, ROMeo® is in its usual wait state, 501A. In some embodiments, the ROMeo Analytics checks if ROMeo Analytics actions are invoked 506, and if not, is in a wait state 505. If ROMeo Analytics actions are invoked, ROMeo Analytics is run 507, and in doing so, outputs a data file 508 for use by ROMeo®, and goes back to wait state 505. In some embodiments, ROMeo® in wait state 509 checks 510 if a new data file from ROMeo Analytics 508 is available, and if so, reads and processes it 511, and invokes ROMeo® with the modified inputs 501A. If not, ROMeo® goes to wait state 509. In this manner, ROMeo Analytics and ROMeo® can wait for each other's input files and respectively process the inputs from each.

Figure 6:
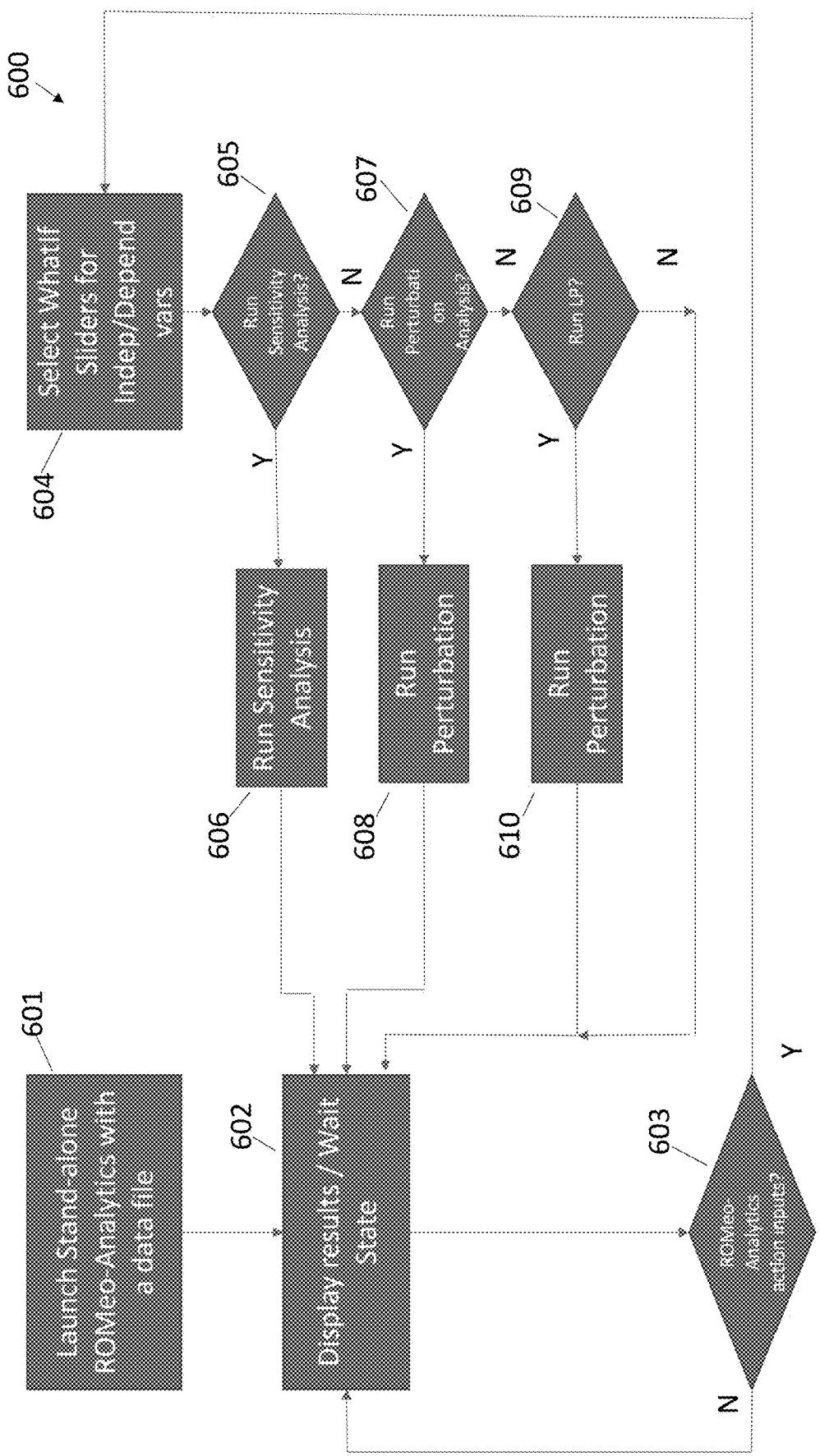
FIG. 6 shows the stand-alone "ROMeo Analytics" and its key features in accordance with some embodiments of the invention.

In reference to FIG. 6, showing a process schematic 600 of the stand-alone ROMeo Analytics and its key features in accordance with some embodiments of the invention. In some embodiments, the stand-alone ROMeo Analytics can be launched and specified to open an existing data-file 601. In some embodiments, it goes to a display result and wait state 602 for user input. In some embodiments, if there is user input 603, the user typically selects and manipulates sliders 604 that represent dependent and independent variables on which the user desires to conduct "What-If" studies 604. In some embodiments, if the user specifies 605 running sensitivity analysis, it does so 606 and goes to wait state 602. Otherwise, if the user specifies running perturbation analysis 607, it does so 608, and goes to a wait state 602. Otherwise, if the user specifies running LP 609, it does so 610 and/or else goes to wait state 602.

For the purposes of this disclosure the term "server" should be understood to refer to a service point which provides processing, database, and communication facilities. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as a Microsoft® Windows® Server, Mac OS X, Unix, Linux, and/or any other conventional operating system. Microsoft® and Windows® are registered trademarks of Microsoft Corporation, Redmond, Wash.

For the purposes of this disclosure a "network" should be understood to refer to a network that may couple devices so that communications may be exchanged, such as between a server and a client device, peer to peer communications, or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, "Integrated Services Digital Networks" (ISDNs), "Digital Subscriber Lines" (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple user or client devices with a network. A wireless network may employ stand-alone ad-hoc networks, mesh networks, wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including "Long Term Evolution" (LTE), WLAN, wireless router (WR) mesh, or 2nd, 3rd, 4th, or 5th generation (2G, 3G, 4G, or 5G) cellular technology, or the like. Network access technologies may enable wide area coverage for devices, such as client devices with varying degrees of mobility, for example. For example, a network may enable RF or wireless type communication via one or more network access technologies, such as "Global System for Mobile communication" (GSM), "Universal Mobile Telecommunications System" (UMTS), "General Packet Radio Services" (GPRS), "Enhanced Data GSM Environment" (EDGE), 3GPP LTE, LTE Advanced, "Wideband Code Division Multiple Access" (WCDMA), Bluetooth®, 802.11b/g/n, or the like. A wireless network may include virtually any type of wireless communication mechanism by which signals may be communicated between devices, such as a client device or a computing device, between or within a network, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a near field communication (NFC) device, a personal digital assistant (PDA), a handheld computer, a tablet computer, a phablet, a laptop computer, a set top box, a wearable computer, an integrated device combining various features, such as features of the forgoing devices, or the like.

A client device may vary in terms of capabilities or features, and claimed subject matter is intended to cover a wide range of potential variations. A web-enabled fixed or mobile device may include a browser application that is configured to receive and to send web pages, web-based messages, and the like. The browser application may be configured to receive and display graphics, text, multimedia, and the like, employing virtually any conventional web-based language.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

Some embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally or in a particular format that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations, steps or processes described herein can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by description and figures.

The invention claimed is:

1. A server system comprising:
one or more computers comprising one or more processors and one or more non-transitory computer-readable storage media for tangibly storing thereon program logic for execution by the one or more processors, the program logic comprising:
a first logic module executable by the one or more processors for receiving at least one data communication from at least one industrial control system coupled to a communications network, the at least one data communication comprising data or data streams associated with at least a portion of at least one industrial process, the program logic of the first logic module comprising at least one model configured to receive at least one variable and iterate and converge an optimization problem to at least one optimization solution to a first level of optimization based at least in part on the at least one variable and at least a portion of the data or data streams; and
a second logic module executable by the at least one processor, the second logic module operatively data-linked to the first logic module, and configured to utilize a model to iteratively process data values of the at least one optimization solution to a second level of optimization, the second level of optimization having an increased level of optimization over the first level of optimization;
wherein the second logic module is configured to generate incremental set-point changes based on the second level of optimization.

2. The server system of claim 1, wherein the first logic module comprises a rigorous on-line modeling and equation-based optimization module.

3. The server system of claim 1, wherein the model used to iteratively process data values of the at least one optimization solution to a second level of optimization comprises a linear model derived from the at least one model of the first logic module.

4. The server system of claim 3, wherein the linear model is derived from the first logic module following convergence to the at least one optimization solution.

5. The server system of claim 3, wherein the linear model is:

$$J_z \Delta z + J_w \Delta w = 0 \qquad \text{(iii)}$$

wherein $J_z$ is a Jacobian of F with respect to independent variables, z, and $J_w$ is a Jacobian of F with respect to dependent variables, w, and Δ is an operator that shows a corresponding quantity is a perturbation from its nominal value.

6. The server system of claim 5, wherein coefficients are obtained by a linearization shown mathematically as follows:

$$J_z = \frac{\partial F(z, w)}{\partial z}\bigg|_{z=z_0, w=w_0}, J_w = \frac{\partial F(z, w)}{\partial w}\bigg|_{z=z_0, w=w_0}$$

wherein $J_z$ is the Jacobian of F with respect to the independent variables, z, and $J_w$ is the Jacobian of F with respect to the dependent variables, w.

7. The server system of claim 1, wherein the optimization problem is represented as:

$$\max \varnothing(z,w), s.t. F(z,w)=0, \text{ and } z \in [z_{MIN}, z_{MAX}], \text{ and}$$
$$w \in [w_{MIN}, w_{MAX}] \quad \text{(i)}$$

for variables X=[z, w], where z are independent variables, and w are dependent variables.

8. The server system of claim 7, wherein an optimal solution of the optimization problem comprises a linearization at a solution point represented as follows:

$$\max C^T \begin{bmatrix} \Delta z \\ \Delta w \end{bmatrix}, \text{ s.t. } [J_z \quad J_w] \begin{bmatrix} \Delta z \\ \Delta w \end{bmatrix} = b(z, w)_0,$$

$$\text{and } \Delta(z, w)_{min} \leq \Delta(z, w) \leq \Delta(z, w)_{max}$$

wherein C is a vector of cost coefficients corresponding to a linearization of φ in the optimization problem, and $J_z$ is a Jacobian of F with respect to the independent variables, z, and $J_w$ is a Jacobian of F with respect to the dependent variables, w, b is a constant vector, and Δ is an operator that shows a corresponding quantity is a perturbation from its nominal value.

9. The server system of claim 1, wherein the model used to iteratively process data values of the at least one optimization solution to a second level of optimization comprises a dimensionally invariant linear model.

10. The server system of claim 1, wherein the model of the second logic module is configured to utilize an actual distance to lower and upper bounds from the at least one optimization solution.

11. The server system of claim 1, wherein the model of the second logic module is configured to enable customizable objective weights.

12. The server system of claim 1, wherein the second logic module is configured to change lower and upper bounds and variables of the model.

13. The server system of claim 1, wherein the second logic module is configured to generate incremental set-point changes between runs of the first logic module.

14. The server system of claim 1, wherein the second logic module includes an ability to perform a quasi-dynamic optimization over a transient period.

15. The server system of claim 1, wherein the program logic is configured to enable a user to select and manipulate sliders on a variables interface on a display, the sliders representing dependent and independent variables for use in an iterative process of at least one of the first logic module and the second logic module.

16. The server system of claim 1, further comprising a variable interface enabling a user to provide the at least one variable by selecting and manipulating sliders on a variables interface on a display, the sliders representing dependent and independent variables for use in at least one of the first logic module and the second logic module.

17. The server system of claim 1, wherein the second logic module includes an ability to perform a quasi-dynamic optimization over a transient period.

* * * * *